United States Patent
Wills et al.

(10) Patent No.: US 9,475,577 B2
(45) Date of Patent: Oct. 25, 2016

(54) RETENTION SYSTEMS FOR ROTORCRAFT PEDAL ASSEMBLIES

(71) Applicant: Bell Helicopter Textron Inc., Fort Worth, TX (US)

(72) Inventors: Patricia Wills, Bluff City, TN (US); Brian Lafon, Johnson City, TN (US); Ricky Jenkins, Bluff City, TN (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 328 days.

(21) Appl. No.: 14/205,886

(22) Filed: Mar. 12, 2014

(65) Prior Publication Data

US 2015/0259065 A1     Sep. 17, 2015

(51) Int. Cl.
| | |
|---|---|
| *B64C 27/56* | (2006.01) |
| *G05G 1/30* | (2008.04) |
| *F16C 11/04* | (2006.01) |
| *F16B 21/12* | (2006.01) |
| *F16B 21/02* | (2006.01) |

(52) U.S. Cl.
CPC ............... *B64C 27/56* (2013.01); *F16C 11/04* (2013.01); *G05G 1/30* (2013.01); *F16B 21/02* (2013.01); *F16B 21/12* (2013.01); *Y10T 403/32951* (2015.01)

(58) Field of Classification Search
CPC ............ G05G 1/30; G05G 1/36; G05G 1/34; G05G 1/305; G05G 1/44; G05G 1/445; B64C 13/22; B64C 13/06; B64C 27/56; B64C 27/58; B64C 13/02; B64C 13/04; B64C 13/24; Y10T 403/32861; Y10T 403/32868; Y10T 403/32877; Y10T 403/32893; Y10T 403/32901
See application file for complete search history.

(56) References Cited

U.S. PATENT DOCUMENTS 1,802,117 A  *  4/1931  Leisy .................... B64C 13/06
                                                244/235
2,420,528 A  *  5/1947  Eaton, Jr. ............... B64C 13/04
                                                244/235

(Continued)

FOREIGN PATENT DOCUMENTS

| DE | 19810167 | 9/1999 |
|---|---|---|
| GB | 10127 | 0/1913 |

OTHER PUBLICATIONS

European Search Report issued in European Application No. 14164684.4 on Jul. 11, 2014, 3 pages.

(Continued)

*Primary Examiner* — Joshua J Michener
*Assistant Examiner* — Matthew Gitlin
(74) *Attorney, Agent, or Firm* — Daniel J. Chalker; Edwin S. Flores; Chalker Flores, LLP

(57) ABSTRACT

One example of a retention system for a rotorcraft pedal assembly includes an insertion member, an axial retention member, and a transverse retention member. The insertion member, which is inserted through a side of a pedal assembly, includes a spring compressible against the side of the pedal assembly in response to the insertion member being inserted through the side. The axial retention member receives and retains the insertion member on an opposing side of the pedal assembly. The transverse retention member is inserted through a passage formed in the axial retention member to secure the axial retention member against the side of the pedal assembly.

18 Claims, 5 Drawing Sheets

(56) References Cited

U.S. PATENT DOCUMENTS

| | | | | |
|---|---|---|---|---|
| 2,922,211 A * | 1/1960 | Boyd | F16B 5/10 | 411/305 |
| 2,923,359 A | 2/1960 | Walter et al. | | |
| 3,157,063 A * | 11/1964 | Mussell | B64C 13/06 | 74/512 |
| 3,377,881 A * | 4/1968 | Lucas | B64C 13/06 | 244/235 |
| 3,446,091 A * | 5/1969 | Stocker | B60K 26/02 | 74/513 |
| 3,641,837 A * | 2/1972 | Dean, Jr. | B60K 26/02 | 74/513 |
| 3,718,950 A * | 3/1973 | Engstrom | F16B 5/0642 | 24/613 |
| 3,827,110 A * | 8/1974 | Dzus, Sr. | F16B 21/165 | 411/348 |
| 4,122,927 A * | 10/1978 | Berg | B64C 13/12 | 192/30 W |
| 4,227,287 A * | 10/1980 | Gunther | F16B 21/04 | 411/350 |
| 4,398,322 A | 8/1983 | Ewen | | |
| 4,442,571 A * | 4/1984 | Davis | F16B 5/10 | 24/586.1 |
| 4,811,921 A * | 3/1989 | Whitaker | B64C 13/06 | 244/234 |
| 4,887,782 A * | 12/1989 | Carnell | B64C 27/56 | 244/234 |
| 5,398,569 A * | 3/1995 | Carr | B60T 7/06 | 403/151 |
| 5,690,460 A * | 11/1997 | Attanasio | F16B 5/10 | 411/551 |
| 6,134,987 A * | 10/2000 | Kalsi | G05G 1/30 | 74/512 |
| 6,338,649 B1 * | 1/2002 | Smith | H01R 11/287 | 411/552 |
| 6,415,681 B1 * | 7/2002 | Porter | G05G 1/305 | 192/13 R |
| 6,468,011 B2 * | 10/2002 | Mayer | F16B 21/18 | 411/107 |
| 6,591,711 B2 * | 7/2003 | Porter | G05G 1/305 | 74/512 |
| 7,055,404 B2 * | 6/2006 | Burgstaler | G05G 1/30 | 74/512 |
| 8,979,458 B2 * | 3/2015 | Sun | H01L 23/4006 | 411/353 |
| 2002/0178859 A1 * | 12/2002 | Porter | G05G 1/305 | 74/512 |
| 2003/0097899 A1 * | 5/2003 | Burgstaler | G05G 1/30 | 74/560 |
| 2004/0065167 A1 * | 4/2004 | Kim | G05G 1/30 | 74/560 |
| 2008/0105790 A1 * | 5/2008 | Christensen | B64C 13/06 | 244/235 |
| 2009/0241724 A1 * | 10/2009 | Hilger | B60T 7/06 | 74/560 |
| 2010/0126298 A1 * | 5/2010 | Spina | G05G 1/46 | 74/490.15 |
| 2011/0120260 A1 * | 5/2011 | Siao | B60K 26/021 | 74/560 |

OTHER PUBLICATIONS

Communication pursuant to Article 94(3) in EP application 14164684.4 on Aug. 22, 2014, 5 pages.

* cited by examiner they have US 9,475,577 B2

RETENTION SYSTEMS FOR ROTORCRAFT PEDAL ASSEMBLIES

TECHNICAL FIELD

This disclosure relates to pedal assemblies, e.g., tail rotor pedal assemblies, of a rotorcraft.

BACKGROUND

A rotorcraft can include one or more rotor systems, e.g., a main rotor system, a tail rotor system, or other rotor systems. A cockpit of the rotorcraft can include flight controls that can allow a pilot and/or a co-pilot to pilot the rotorcraft. The co-pilot's seat can sometimes be occupied by a non-pilot. In such situations, the co-pilot's flight controls can be disabled and/or removed to prevent the non-pilot from interfering with piloting the rotorcraft.

SUMMARY

This disclosure describes retention systems for rotorcraft pedal assemblies.

Certain aspects of the subject matter described here can be implemented as a rotorcraft pedal retention system. The pedal retention system includes an insertion member inserted through a side of a pedal assembly. The insertion member includes a spring compressible against the side of the pedal assembly in response to the insertion member being inserted through the side. An axial retention member receives and retains the insertion member on an opposing side of the pedal assembly. A transverse retention member is inserted through a passage formed in the axial retention member.

This, and other aspects, can include one or more of the following features. An end of the insertion member on the side of the pedal assembly can include a head. The spring can be positioned between the head and the side of the pedal assembly. A diameter of the head can be greater than an outer diameter of the spring. The head can be knurled. An end of the insertion member on the opposing side of the pedal assembly can include an insertion member tab having a non-circular cross-section. The axial retention member can define a passage to receive the insertion member tab, and define a pocket to retain the insertion member tab when the insertion member is rotated on the axis of the insertion member. The passage defined by the axial retention member can include a dimension that is greater than a long dimension of the cross-section of the insertion member tab. The pocket defined by the axial retention member can have a dimension that is less than the long dimension. The transverse retention member can be a cotter pin. The passage formed in the axial retention member to receive the transverse retention member can be at an angle to an axial direction of the axial retention member. An outer diameter of a portion of the spring abutting the side of the pedal assembly can be greater than a size of a passage formed through the pedal assembly to receive the insertion member.

Certain aspects of the subject matter described here can be implemented as a rotorcraft pedal retention system. An insertion member is inserted through a side of a pedal assembly. The insertion member compresses a spring against the side of the pedal assembly in response to the insertion member being inserted through the side. An axial retention member receives the insertion member on an opposing side of the pedal assembly. The axial retention member opposes a force of the compressed spring away from the side of the pedal assembly.

This, and other aspects, can include one or more of the following features. An end of the insertion member on the side of the pedal assembly can include a head. The spring can be positioned between the head and the side of the pedal assembly. A diameter of the head can be greater than an outer diameter of the spring. The head can be knurled. A transverse retention member can be inserted through a passage formed in the axial retention member. A spring can be positioned between the head and the side of the pedal assembly.

Certain aspects of the subject matter described here can be implemented as a rotorcraft pedal assembly retention system. An insertion member is inserted through a side of a pedal assembly. An end of the insertion member includes a head to compress a spring against the side of the pedal assembly in response to the insertion member being inserted through the side. An axial retention member receives an opposing end of the insertion member on an opposing side of the pedal assembly. The axial retention member retains the opposing end against the opposing side in response to a partial rotation of the insertion member.

This, and other aspects, can include one or more of the following features. A transverse retention member can be inserted through a passage formed in the axial retention member. The transverse retention member can include a cotter pin. The head can be knurled.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
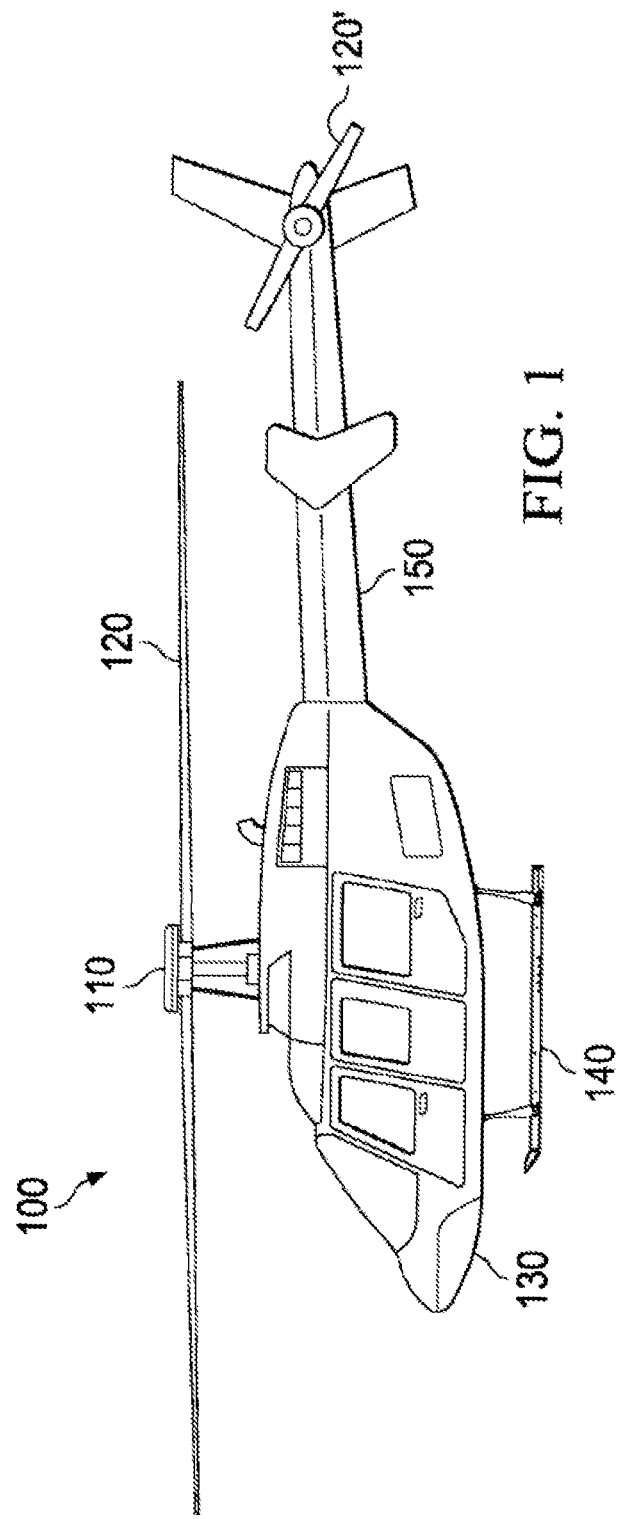
FIG. 1 is a schematic diagram showing an example of a rotorcraft.

This disclosure describes retention systems for rotorcraft pedal assemblies. FIG. 1 is a schematic diagram showing an example of a rotorcraft 100. The rotorcraft 100 includes a rotor system 110, blades 120, a fuselage 130, landing gear 140 and an empennage 150. Rotor system 110 can rotate blades 120, and can include a control system for selectively controlling the pitch of each blade 120 to selectively control direction, thrust and lift of rotorcraft 100. Fuselage 130 can include the body of the rotorcraft 100 and can be coupled to the rotor system 110 such that the rotor system 110 and the blades 120 move the fuselage 130 through the air. Landing gear 140 can support the rotorcraft 100 when the rotorcraft 100 is landing and/or when the rotorcraft 100 is at rest on the ground. Empennage 150 can include the tail section of the rotorcraft 100 and can include components of the rotor system 110 and blades 120'. The blades 120' can provide thrust in the same direction as the rotation of the blades 120 to counter the torque effect created by the rotor system 110 and the blades 120. Some implementations of rotor systems described here can apply to the rotor system 110 and/or other rotor systems, such as other tilt rotor systems, helicopter rotor systems, combinations of them, or other rotor systems. In some implementations, the rotorcraft 100 can be a helicopter, while in others, the rotorcraft 100 can be any other rotorcraft, e.g., airplanes, unmanned aircraft, or other rotorcraft.

In some implementations, the rotorcraft 100 (e.g., a helicopter) can include a cockpit that includes a set of flight controls for a pilot and a co-pilot). The set of flight controls can include a cyclic, a collective stick, and rotor pedal assemblies (e.g., tail rotor pedals). Sometimes, an operator of the rotorcraft 100 (e.g., the helicopter pilot) can allow a non-pilot to occupy the co-pilot seat. To do so, the operator may first remove the co-pilot's set of flight controls so that the non-pilot can occupy the location and not affect the flight of the rotorcraft 100. In some situations, the rotor pedal assemblies can be connected to the control linkage using a bolt, nut, cotter pin and press-fit pin. Such connections can render the rotor pedal assemblies more difficult to disassemble relative to the cyclic, the collective stick, or other components of the set of flight controls. Consequently, the rotor pedal assemblies of the co-pilot's set of flight controls may be left intact even when a non-pilot occupies the co-pilot's seat. Doing so poses a safety hazard as the non-pilot can place their feet on the pedal assemblies, thereby affecting the safe operation of the rotorcraft 100. Further, such design does not allow for quick removal of the rotor pedal assemblies.

This disclosure describes a retention system for the rotor pedal assemblies that allow faster removal of the rotor pedal assemblies from the control linkage relative to retention systems that include the bolt, the nut, the cotter pin and the press-fit pin. As described below, the rotor pedal assemblies are assembled using a pedal retention system that includes an insertion member, an axial retention member, and a transverse retention member. Relative to a retention system that includes the bolt, the nut, the cotter pin and the press-fit pin, the retention system described here can enable quick disassembly of the rotor pedal assembly from the control linkage. Quicker disassembly of the rotor pedal assembly can allow for removal of the rotor pedal assemblies from the co-pilot's seat. Such removal can decrease or eliminate a possibility of the non-pilot placing his/her feet on the rotor pedal assemblies, and, in turn, can improve a safety of operation of the rotorcraft 100. With the quick re-installation of the rotor pedal assembly, operators of aircrafts used in emergency situations can quickly and safely convert the co-pilot area of the aircraft from a non-pilot side to a pilot side.

Figure 2:
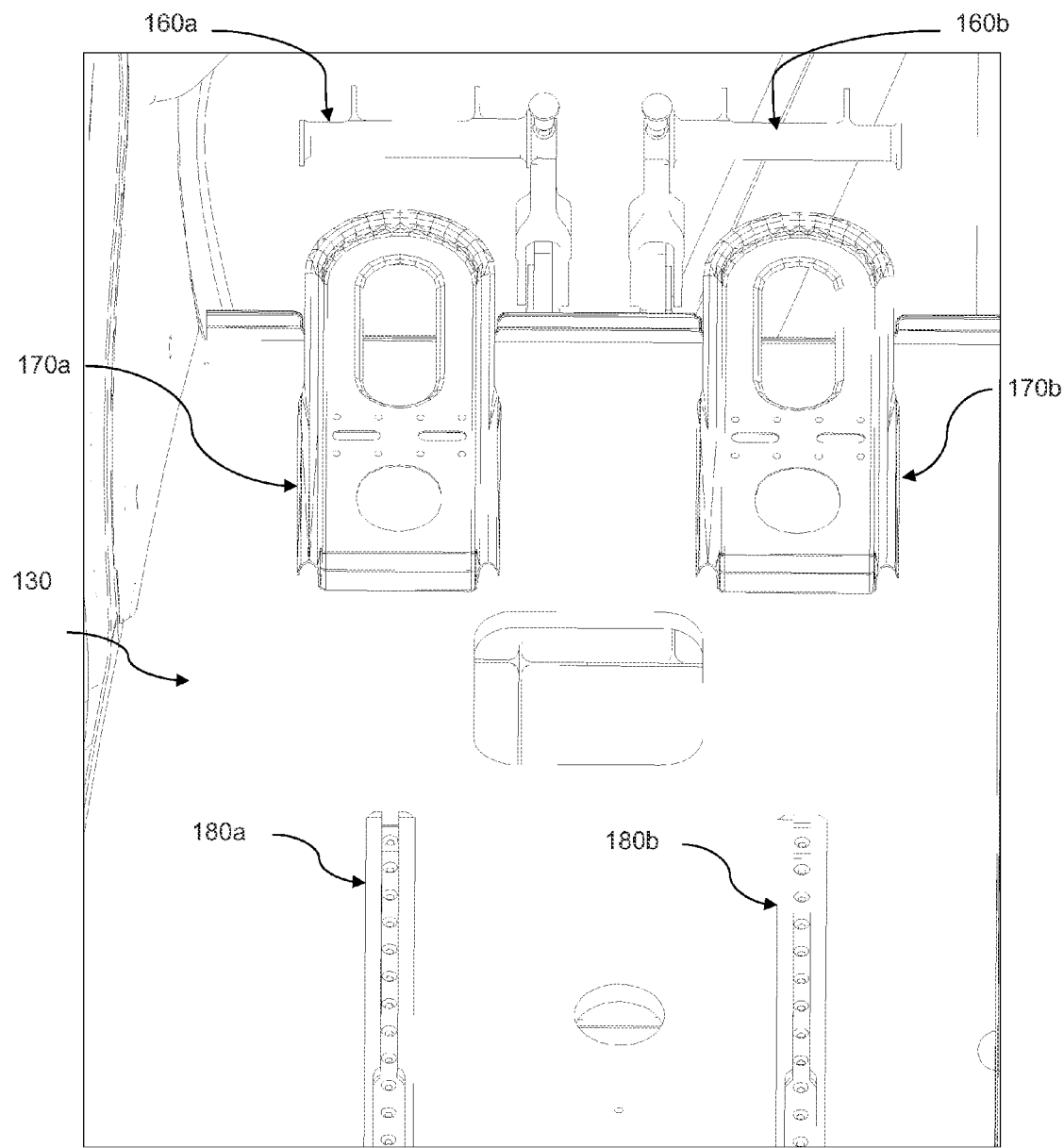
FIG. 2 is a schematic diagram showing examples of rotorcraft pedal assemblies in a fuselage of the rotorcraft.

FIG. 2 is a schematic diagram showing examples of rotorcraft pedal assemblies in a co-pilot side in a fuselage 130 of the rotorcraft 100. In some implementations, the fuselage 130 includes a left pedal assembly 160a and a right pedal assembly 160b connected to each other and to a left heel rest 170a and a right heel rest 170b, respectively. The fuselage 130 further includes seat tracks 180a and 180b. FIG. 2 shows that the cyclic and the collective stick have been removed from the co-pilot side of the cockpit. The left pedal assembly 160a and the right pedal assembly 160b can be assembled using respective pedal retention systems.

Figure 3:
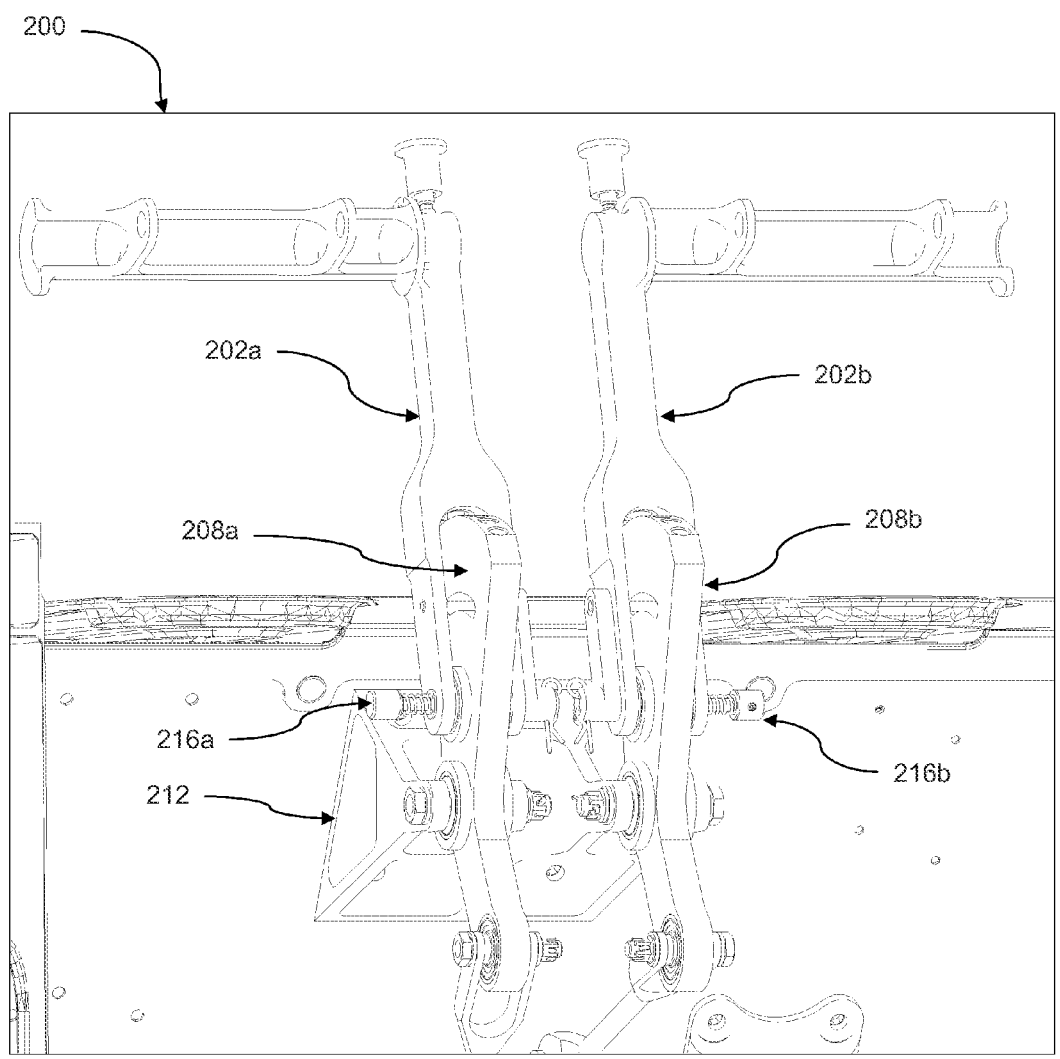
FIG. 3 is a schematic diagram showing pedal assemblies.

FIG. 3 is a schematic diagram showing pedal assemblies 200 including the left pedal assembly 160a and the right pedal assembly 160b. The left pedal assembly 160a includes an upper pedal assembly 202a and a lower pedal assembly 208a connected by a left pedal retention system 216a. The right pedal assembly 160b includes an upper pedal assembly 202b and a lower pedal assembly 208b connected by a right pedal retention system 216b. A support bracket 212 connects the lower pedal assembly 208a and the lower pedal assembly 208b. The components of the left pedal retention system 216a are described below with reference to FIGS. 4, 5A, 5B, 6A and 6B. The components of the right pedal retention system 216b are substantially similar to those of the left pedal retention system 216a. In some implementations, the left and right pedal retention systems can include identical components.

Figure 4:
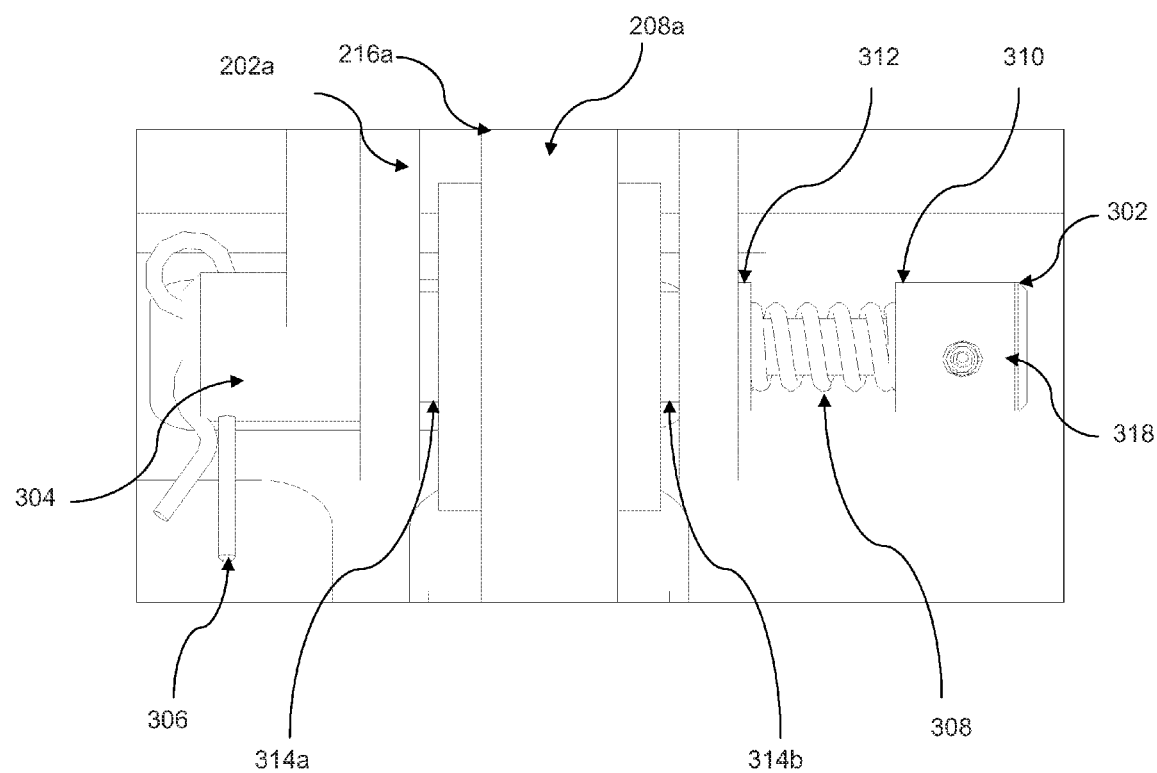
FIG. 4 is a schematic diagram showing a front view of the left pedal retention system.
Figures 5A, 5B:
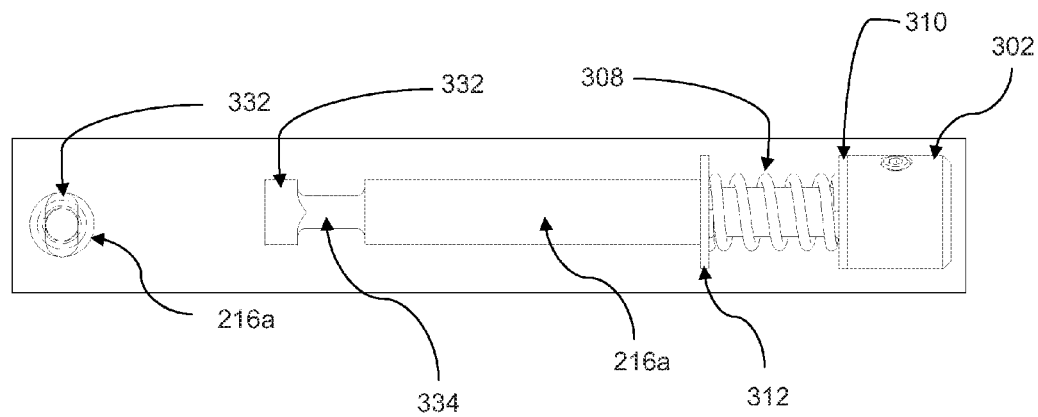
FIGS. 5A and 5B are a side view and a front view, respectively, of an example insertion member of the left pedal retention system.

FIG. 4 is a schematic diagram showing a front view of the left pedal retention system 216a. FIGS. 5A and 5B are a side view and a front view, respectively, of an example insertion member 302 of the left pedal retention system 216a. The left pedal retention system 106a includes an insertion member 302 inserted through a side of the left pedal assembly 160a. For example, the insertion member 302 can be a quick pin or other insertion member sized to have an outer diameter sufficient to be passed through a passage formed in the side of the left pedal assembly 160a and a length sufficient to protrude out of the other side of the left pedal assembly 160a upon insertion. In some implementations, the insertion member 302 is inserted through openings in the side of the upper pedal assembly 202a and the lower pedal assembly 208a and through bearings 314a and 314b.

An end of the insertion member 302 on the side of the left pedal assembly 160a includes a head 318. In some implementations, the head 318 is knurled to facilitate gripping the insertion member 302, e.g., to turn the insertion member 302. As an alternative or in addition to the head 318, the end of the insertion member 302 on the side of the left pedal assembly 160a can include one or more tab members (e.g., to form a T-shape) to facilitate gripping the insertion member 302, e.g., to turn the insertion member 302. Further alternatives can include a t-handle, a quarter-turn lever, or any knob shape that can facilitate turning the head 318, e.g., by a quarter turn or 90 degree turn.

The insertion member 302 includes a spring 308 positioned between the head 318 and the side of the left pedal assembly 160a. The diameter of the head 318 is greater than an outer diameter of the spring 308. In addition, the outer diameter of the spring 308 is greater than a diameter of the passage in the side of the left pedal assembly 160 through which the insertion member 302 is passed. In some implementations, the spring 308 can be a cylindrical spring, while in others, the spring can be non-cylindrical. In some implementations, more than one spring can be positioned between the head 318 and the side of the left pedal assembly 160. In some implementations, a washer 310 can be positioned between the head 318 and one end of the spring 308, and another washer 312 can be positioned between the side of the left pedal assembly 160a and the other end of the spring 308. In such implementations, the diameters of the ends of the springs can be greater than an inner diameter of the washers 310 and 312.

An end of the insertion member 302 on the opposing side of the left pedal assembly 160a includes an insertion member tab 332. The insertion member tab 332 has a non-circular cross-section. For example, the insertion member tab 332 can have an elliptical cross-section with a long diameter of the ellipse being substantially equal to a diameter of the insertion member 302, and the short diameter of the ellipse being less than the diameter of the insertion member 302. Alternatively, the insertion member tab 332 can have a different non-circular cross-section. The insertion member 302 also includes an insertion member portion 334 having a reduced diameter relative to the diameter of the insertion member 302. For example, in implementations in which the insertion member tab 332 have an elliptical cross-section, the reduced diameter of the insertion member portion 334 can be substantially equal to or less than the short diameter of the ellipse.

Figures 6A, 6B:
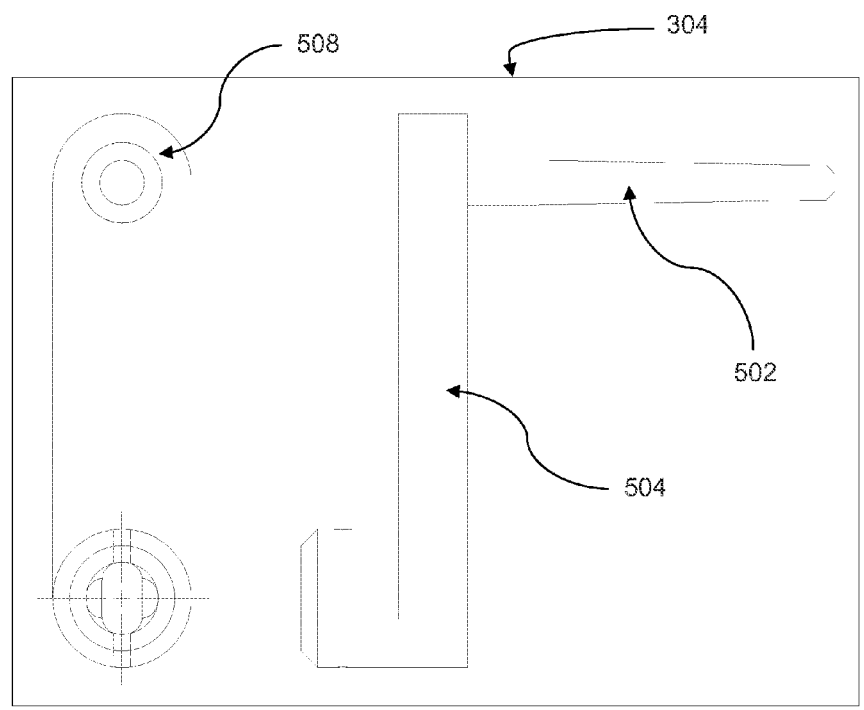
FIGS. 6A and 6B are a side view and a front view, respectively, of an example axial retention member of the left pedal retention system.

The left pedal retention system 216a includes an axial retention member 304 to receive and retain the insertion member 302 on an opposing side of the left pedal assembly 160a. FIGS. 6A and 6B are a side view and a front view, respectively, of an example axial retention member 304 of the left pedal retention system 216a. The axial retention member 304 defines a passage 510 to receive the insertion member tab 332. The axial retention member 304 defines a pocket 512 to retain the insertion member tab 332 when the insertion member 302 is rotated on the axis of the insertion member 302. The passage 510 defined by the axial retention member 304 includes a dimension that is greater than a long dimension of the cross-section of the insertion member tab 332. The pocket 512 defined by the axial retention member 304 includes a dimension that is less than the long dimension. As described below, the passage 510 and the pocket 512 are sized and arranged to receive the insertion member tab 332 through the passage 510 and to retain the insertion member tab 332 in the pocket 512 when the insertion member 302 is rotated about the longitudinal axis of the insertion member 302.

The axial retention member 304 can include a guide pin 502 to pass through another passage in the left pedal assembly 160, e.g., above the passage through which the insertion member 302 is inserted. The axial retention member 304 can also include a guide pin head 508 to guide the guide pin 502 through the passage. The axial retention member 304 can additionally include a weldment link that connects the guide pin 502 to the portion of the axial retention member 304 that defines the passage 510 and the pocket 512. In some implementations, the axial retention member 304 is a pin weldment.

The left pedal retention system 216a includes a transverse retention member 306 inserted through a passage 514 formed in the axial retention member 304. For example, the transverse retention member 306 can be a cotter pin. Alternatively, the transverse retention member 306 can be a hitch pin, a bridge pin, a spring cotter pin, a snap ring, a split pin, an r-clip, a hairpin clips, a clevis pin, a quick pin, multiple such pins, or combinations of them. The passage 514 formed in the axial retention member 304 to receive the transverse retention 306 can be at an angle to an axial direction of the axial retention member 304. For example, the direction of the passage 514 can be substantially perpendicular (or at a different angle) to the longitudinal axis of the insertion member 302 inserted into the axial retention member 304. In some implementations, the transverse retention member 306 can pass through the axial retention member 304 but not the insertion member 302. In some implementations, a passage can be formed in the insertion member 302 (e.g., through the insertion member tab 332) such that the transverse retention member 306 is passed through the axial retention member 304 and the insertion member 302.

To connect the left pedal assembly 160a to the control linkage, in some implementations, the insertion member 302 is inserted through the passage on the side of the left pedal assembly 160a. When the insertion member 302 is inserted into the side of the left pedal assembly 160a (e.g., the side of the upper pedal assembly 202a), the spring 308 is compressed against the side of the left pedal assembly 160a and the head 318 of the insertion member 302. The compressed spring 308 exerts a force on the insertion member 302 in a direction away from the side of the left pedal assembly 160a. On the opposing side of the left pedal assembly 160a, the axial retention member 304 is positioned by inserting the guide pin 502 through the passage in the left pedal assembly 160a. The insertion member tab 332 passes through and protrudes out of the left pedal assembly 160a on the opposing side. On the opposing side, the insertion member tab 332 passes through the passage 510 in the axial retention member 304.

The insertion member 302 is then turned on its longitudinal axis. For example, an operator grips the head 318 and turns the insertion member 302 by 90°. The insertion member tab 332 rotates by 90°. When released, the compressed spring 308 exerts a force away from the left pedal assembly 160a to cause the insertion member 302 to exit the passage through which the insertion member 302 is inserted. But, the dimension of the insertion member tab 332 and that of the pocket 512 cause the insertion member tab 332 to be retained in the axial retention member 304. The transverse retention member 306 is then inserted into the passage 514 formed in the axial retention member 304. In this manner, the left pedal retention system 216a connects the left pedal assembly 160a is connected to the control linkage.

To disassemble the left pedal assembly 160a, the transverse retention member 306 is removed from the passage 514. The insertion member 302 is rotated such that the long dimension of the cross-section of the insertion member tab 332 aligns with the long dimension of the passage 510 through which the insertion member tab 332 was inserted. In this configuration, the force of the compressed spring 308 causes the insertion member 302 to be pushed out of the passage in the left pedal assembly 160a. In this manner, the left pedal retention system 216a is disassembled to release the left pedal assembly 160a from the control linkage. This operation to connect/release the left pedal assembly 160a is quicker than an operation that involves connecting/releasing a nut, bolt, cotter pin and press-fit pin.

The right pedal retention system 216b can include components that are substantially similar to (e.g., identical to) those in the left pedal retention system 216a. In some implementations, the transverse retention member can be excluded from the pedal retention system.

A number of implementations have been described. Nevertheless, it will be understood that various modifications may be made without departing from the spirit and scope of the disclosure.

The invention claimed is:

1. A rotorcraft pedal retention system comprising:
an insertion member inserted through a side of a pedal assembly of a rotorcraft, the insertion member including a spring compressible against the side of the pedal assembly in response to the insertion member being inserted through the side, wherein an end of the insertion member on the opposing side of the pedal assembly includes an insertion member tab having a non-circular cross-section;
an axial retention member to receive and retain the insertion member on an opposing side of the pedal assembly, wherein the axial retention member defines a passage to receive the insertion member tab and defines a pocket to retain the insertion member tab when the insertion member is rotated on an axis of the insertion member; and a transverse retention member inserted through a passage formed in the axial retention member.

2. The system of claim 1, wherein an end of the insertion member on the side of the pedal assembly includes a head, wherein the spring is positioned between the head and the side of the pedal assembly.

3. The system of claim 2, wherein a diameter of the head is greater than an outer diameter of the spring.

4. The system of claim 2, wherein the head is knurled.

5. The system of claim 1, wherein the passage defined by the axial retention member includes a dimension that is greater than a long dimension of the cross-section of the insertion member tab, and wherein the pocket defined by the axial retention member includes a dimension that is less than the long dimension.

6. The system of claim 1, wherein the transverse retention member is a cotter pin.

7. The system of claim 1, wherein the passage formed in the axial retention member to receive the transverse retention member is at an angle to an axial direction of the axial retention member.

8. The system of claim 1, wherein an outer diameter of a portion of the spring compressible against the side of the pedal assembly is greater than a size of a passage formed through the pedal assembly to receive the insertion member.

9. A rotorcraft pedal retention system comprising:
an insertion member inserted through a side of a pedal assembly and comprising a spring, the insertion member to compress the spring against the side of the pedal assembly in response to the insertion member being inserted through the side, wherein an end of the insertion member on the opposing side of the pedal assembly includes an insertion member tab; and
an axial retention member to receive the insertion member on an opposing side of the pedal assembly and to oppose a force of the compressed spring away from the side of the pedal assembly, wherein the axial retention member defines a passage to receive the insertion member tab and defines a pocket to retain the insertion member tab when the insertion member is rotated on an axis of the insertion member.

10. The system of claim 9, wherein an end of the insertion member on the side of the pedal assembly includes a head, wherein the spring is positioned between the head and the side of the pedal assembly.

11. The system of claim 10, wherein a diameter of the head is greater than an outer diameter of the spring.

12. The system of claim 10, wherein the head is knurled.

13. The system of claim 10, further comprising a spring positioned between the head and the side of the pedal assembly.

14. The system of claim 9, further comprising a transverse retention member inserted through a passage formed in the axial retention member.

15. A rotorcraft pedal assembly retention system comprising:
an insertion member inserted through a side of a pedal assembly, an end of the insertion member including a head to compress a spring against the side of the pedal assembly in response to the insertion member being inserted through the side, wherein an opposing end of the insertion member includes an insertion member tab; and
an axial retention member to receive the opposing end of the insertion member on an opposing side of the pedal assembly and to retain the opposing end against the opposing side in response to a partial rotation of the insertion member, wherein the axial retention member defines a passage to receive the insertion member tab and defines a pocket to retain the insertion member tab when the insertion member tab is partially rotated on an axis of the insertion member.

16. The system of claim 15, further comprising a transverse retention member inserted through a passage formed in the axial retention member.

17. The system of claim 16, wherein the transverse retention member comprises a cotter pin.

18. The system of claim 15, wherein the head is knurled.

* * * * *